Jan. 12, 1943.  G. R. ECKSTEIN ET AL  2,308,161
DRYING
Filed April 19, 1941  2 Sheets-Sheet 1
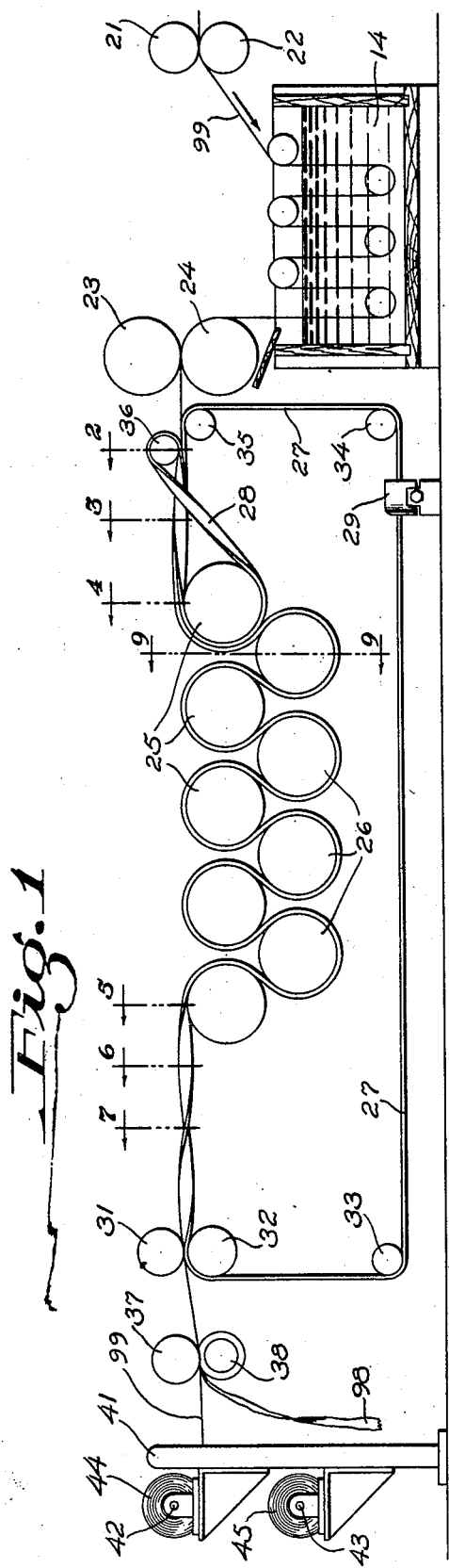
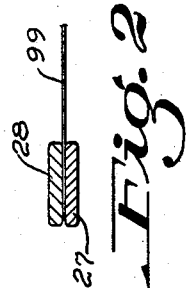
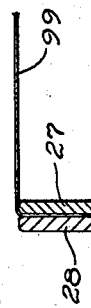
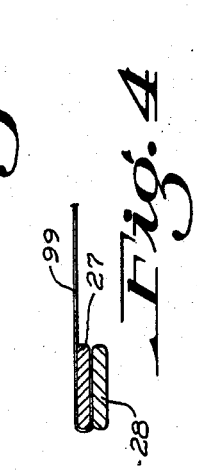
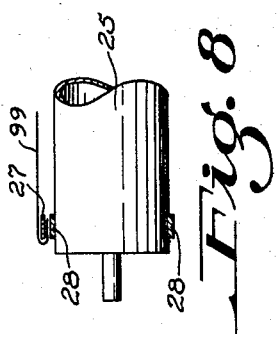
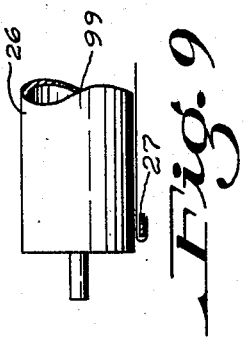
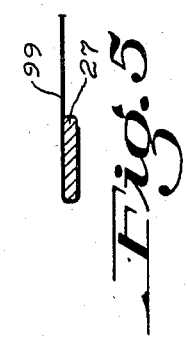
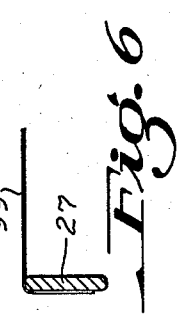
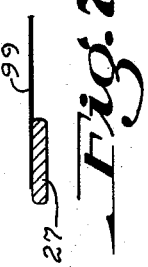
George R. Eckstein
Oscar W. Diverall
INVENTOR
BY 
ATTORNEY

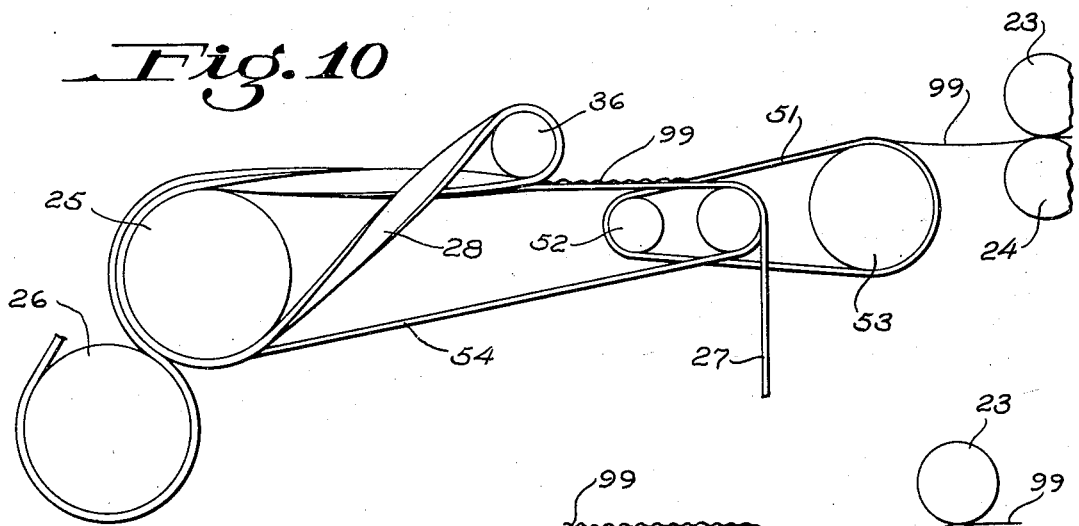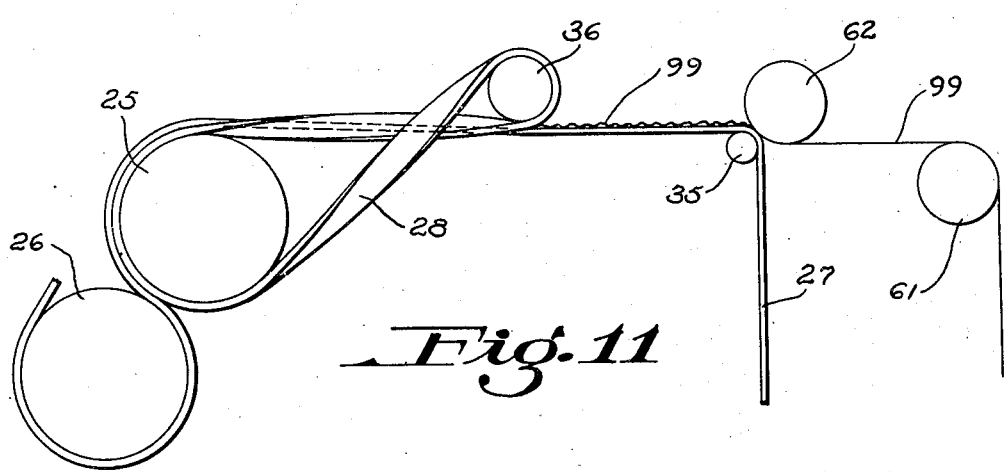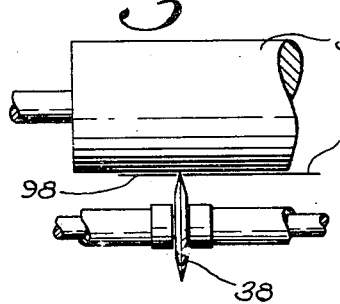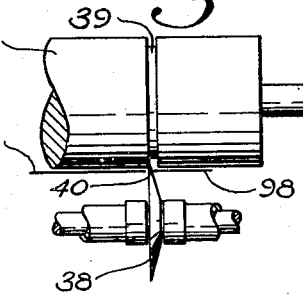

Patented Jan. 12, 1943

2,308,161

UNITED STATES PATENT OFFICE 2,308,161

DRYING

George R. Eckstein, Bridgeport, Conn., and Oscar W. Diverall, Old Hickory, Tenn., assignors to E. I. du Pont de Nemours & Company, Wilmington, Del., a corporation of Delaware Application April 19, 1941, Serial No. 389,394

12 Claims. (Cl. 34—41)

This invention relates to sheet wrapping material, especially the drying of delicate, transparent cellulosic and similar water-sensitive webs which are subject to a high degree of shrinkage during drying. More specifically it appertains to the drying of thin, regenerated cellulose film in such a way that it has more uniform physical characteristics (particularly shrinkage and deformation) and is freer from surface blemishes than the product obtained by conventional processes. In particular the invention also comprehends a novel tentering drier and system of drying.

One of the most recently developed sheet wrapping materials now appearing in commerce is transparent regenerated cellulose film approximately 0.001 of an inch thick. The manufacture of such material in a continuous manner from viscose is disclosed in U. S. A. Patent No. 1,548,864 (Brandenberger). The conventional procedure for large scale operations in general involves continuous extrusion of a sheet of cellulose xanthate solution (viscose) through a narrow slot directly into a coagulating (and/or regenerating) bath. When the coagulated web has attained sufficient strength, it is removed from the coagulating bath and subjected to subsequent processing to prepare it for the market. The subsequent treatment ordinarily involves converting (regenerating the cellulose), washing, desulfuring (removing the sulfur formed by decomposition of the xanthate radical), washing, bleaching (or dyeing, depending upon the use which is to be made of the product), washing, impregnating with softener (which remains in the film after drying), and drying.

Heretofore it has been impossible to produce this sheet material with the physical properties of the desired order of perfection by any process which could be practiced on a commercial scale. Many of the uses to which such material is (for lack of a better material), and might be (if better material were available), put demand flatness of sheet, great uniformity of physical properties (in different directions in the sheet), and great stability of dimensions (with respect to time and atmospheric conditions).

The undesirable characteristics (particularly non-uniformity) of conventional material can in a large measure be traced to the method of drying. Regenerated cellulose sheet or web, as it leaves the aqueous treating baths of the casting apparatus and enters the drier, is in a highly swollen condition, containing 300% to 400% of water (based on the weight of the cellulose) intimately associated therewith in the submicroscopic structure. The removal of this large amount of water results in a considerable tendency of the material to shrink.

Apparently the most satisfactory way of drying a continuous web of this type is to pass it around rollers which forward and support it during the drying stage. Usually the drying rollers supply all the heat for evaporating the water, but in some forms of apparatus a dehydrating environment (atmosphere heated and/or otherwise controlled) around the web may assist in the moisture removal.

Drying on rollers produces a difference in the degree of shrinkage laterally across the web. The central portions are held in a distended state or position by the frictional forces (caused by contact with the roller) by the relatively larger area of web extending to the marginal portions. As will be apparent from a consideration of this situation, the portions of the web nearest the edge shrink the most, because they are not subject to so great a restricting influence. Shrinkage laterally in any region results in a gauge increase in that region. Consequently a gel web having originally surfaces which were approximately parallel, will, after drying while stretched over rollers, have marginal portions which are relatively thicker than the central portions. In order to overcome this and to produce a flat sheet, it has previously been proposed that the viscose be extruded into the initial coagulating bath in the form of a sheet having a somewhat elliptical cross-section. Such an extrusion is extremely difficult to control, and requires not only a very delicate adjustment of the extrusion mechanism, but continual attention to compensate for the numerous factors encountered during the course of manufacture and drying of the web which affect the shrinkage characteristics in the drier.

Even this procedure has left much to be desired.

Extrusion equipment is much more complicated in design when it is arranged to permit this adjustment. Furthermore, the elliptical gauge of extrusion results in distortions and deformations during the early stages of treatment in the wet end of the casting machine which in themselves result in a non-uniform sheet. This can be illustrated by considering the edges of the extruded sheet which, being thin, coagulate and regenerate first, and therefore attempt to shrink first. In shrinking, they accept the load of dragging the remainder of the sheet through the bath, putting such a strain on the marginal structure at this state of regeneration that distortion results. This distortion in turn is responsible for a difference in the characteristics of the web, which not only makes the handling of the web during the casting process difficult, but results in still further non-uniformities.

This invention had for an object the provision of new and improved methods and apparatus for drying water-sensitive films subject to shrinkage upon drying. Further objects were to provide a method for drying regenerated cellulose and like films which would prevent the transverse shrinkage of the film during the drying step, to provide a method of drying non-fibrous cellulosic gel film so as to obtain uniform properties, and to provide an apparatus for tentering gel regenerated cellulose film. Still other objects were to design a method of accurately controlling the amount of lateral shrinkage permitted in the drying of continuous regenerated cellulose webs on drying rollers, to design a method of accurately controlling the amount of machine direction shrinkage permitted in the drying of continuous regenerated cellulose web on drying rollers, and to correlate in a controllable manner the lateral and transverse shrinkage of regenerated cellulose web during the drying while distended over rollers.

It has now been found that the lateral shrinkage of continuous regenerated cellulose webs can be controlled during passage over drying rolls by wrapping the edge of the web around thin belts and tentering the web during drying by gripping it between said rollers and said belt.

How the foregoing objects and related ends are accomplished will be apparent from the following description, in which are disclosed the principle and divers embodiments of the invention, including the best mode contemplated for carrying out the same. The written description is amplified by the accompanying drawings, in which:

Figure 1 is a diagrammatic side elevation view partly in section, showing the drying apparatus of the present invention;

Figures 2, 3 and 4 are partial section views taken along the lines 2, 3 and 4, respectively of Figure 1, looking away from the wet end of the casting machine;

Figures 5, 6 and 7 are partial section views taken along the lines 5, 6 and 7, respectively, of Figure 1 looking toward the drying end of the apparatus;

Figure 8 is a view similar to Figure 4 along the line 4 of Figure 1, but differing therefrom by including the first upper drying roller;

Figure 9 is a view similar to Figure 8 along the line 9—9 of Figure 1 looking toward the wet end of the casting machine, including the first lower drying roller;

Figure 10 is a diagrammatic side elevation view of a modification showing a tucking and shirring device;

Figure 11 is a diagrammatic side elevation view of still another form of device for transferring the web to the drier;

Figure 12 is a diagrammatic side elevation view illustrating a simplified form of shirred web feeding apparatus for a tucking device; and Figures 13 and 14 are diagrammatic elevation views, looking in the direction of travel of the continuous web, the web edge removing devices suitable for preceding the wind-up apparatus.

Similar characters refer to similar parts throughout the similar views.

In the drawings the numeral 99 indicates a continuous web being processed. At the right hand side of Figure 1 the gel regenerated cellulose web 99, which has been desulfured, bleached and washed in the manner described in U. S. A. Patent No. 1,548,864, is transferred from the preceding portion of the casting machine (not shown) to the softener impregnating bath 14, by squeeze rollers 21 and 22. Squeeze rollers 23 and 24 remove the web from this final treating bath and pass it to the drier.

The drier shown comprises upper drying rollers 25, lower drying rollers 26, a tenter belt 27, a tucking belt 28, a tenter belt control guide or transverse positioner 29, and auxiliary apparatus such as web transfer rollers 31 and 32, tenter belt guide rollers or pulleys 33, 34 and 35, and a tucking belt pulley or guide 36.

In operation the web 99, after leaving the squeeze rollers 23 and 24, is fed on to the top of the tenter belt 27, and immediately thereafter passes under the tucking belt 28, as shown by the location of the various parts, in the neighborhood of the rollers 35 and 36. It will be understood that there is a tenter belt and a tucking belt located at each edge of the continuous web. In order to understand their operation, it will only be necessary to describe the action of one set.

After passing the roller 36, the tenter belt and the tucking belt, with the edge of the web gripped therebetween as shown in Figure 2, twist through an angle of 180° before passing around the first upper drying roller 25. The relation of the two belts and the web, which has been tucked around the tenter belt as they contact this upper drying roller, is shown in Figure 4. The relation of these parts during the tucking operation is shown in the intermediate stage drawing of Figure 3.

The travel of the web around the first upper drying roller brings it into contact with the first lower drying roller 26 in the relation shown in Figure 9. At this point the tucking belt 28 leaves the web as shown in Figures 1 and 8, and returns to the roller 26. The tenter belt 27 with the edge of the web tucked thereabout, then passes over the remaining drying rollers as shown in Figure 1.

After leaving the last drying roller, the tenter belt and web pass between transfer rollers 31 and 32, which pass the web to wind-up apparatus and the tenter belt to rollers 33, 34 and 35 for another passage through the drying rolls with a subsequent portion of the web. Between the last drying roller and the transfer roller 32, the tenter belt is twisted through an angle of 360° to free it from the web. A change in plane of 180° (the amount of twist taking place between the roller 36 and the first upper drying roller) is ordinarily sufficient to disengage the web, but the extra half twist is commonly used as a precaution against any undue adherence of these elements. The relative positions of the tenter belt and web during the untwisting (untucking) is illustrated in Figures 5, 6 and 7. It is to be understood that the twisting operation as the tenter belt leaves the web, is in the opposite direction to that taken during the tucking operation at the adit of the drier.

It will also be understood that the twisting of the tenter belt on the opposite side of the web 99 is the reverse of the operation described above.

In order to prevent dislocation of the tenter belt laterally on the rollers about which it passes, for example, by being drawn toward the center of the web by shrinkage thereof, a transverse positioning device 29 controls the position of the tenter belt as it passes over the rollers 34 and 35 to contact the marginal portion of the gel web entering the drier.

Depending upon several factors, such as the texture of the tenter belt, etc., the portion of the web adjacent thereto during drying may become marred, and its removal before the web is rolled up for shipment may be desirable. For this purpose a slitting device is positioned between the transfer rollers 31 and 32 and the wind-up device indicated at 41. Margin removal devices are conventional and generally comprise a supporting roller 37 and a cutting disc 38. The supporting roller may be grooved as shown at 39, to receive the edge of the cutting disc 40 as shown in Figure 14, or may simply provide a tangential contacting surface, as shown in Figure 13.

The wind-up device 41, as shown in Figure 1, comprises brackets for 2 winding axles 42 and 43. This enables one of the mill rolls 44 and 45 to be removed at the convenience of the machine operator while the other is being completed. One of the discarded edge portions of the web 99 is illustrated at 98.

In order to take care of the machine direction shrinkage in the web, which, for proper correlation of transverse (lateral) and longitudinal (machine direction) shrinkage may be desirable, the gel web from the last treating bath may be shirred before being fed to the tucking device. Various arrangements for accomplishing this are shown in Figures 10 and 12. In Figure 12, the speed of the tenter belt 27 is controlled (relative to the transfer rollers 23 and 24) so that the web 99 sags, as shown at 97. This causes the web to contact the tenter belt in the proper position, or at the proper angle, to facilitate shirring, with the result that the accumulated web material is loosely wrinkled or puckered by the time it reaches the tucking apparatus.

In Figure 10 a transfer belt 51, rotating over pulleys or rollers 52 and 53, receives the web from the rollers 23 and 24 and passes it to the tucking device at a greater linear speed than that of the tenter belts, whereby the desired shirring is obtained.

Figure 11 illustrates a variation in the scheme for tucking the web about the tenter belt. In this figure the tucking belt twists through an angle of 180°, while the tenter belt does not twist. The result is a wiping or wrapping of the web about the tenter belt, which maintains its original direction of travel. The position of the tenter belt, tucking belt, web and first drying roller at the end of the tucking operation are the same as that described in connection with Figure 1 and shown in Figure 8. The web feeding arrangement involves two large guide rollers 61 and 62 and a pulley roller 35.

Span supporting belts, the nearest one of which is shown at 54 in Figure 10, may be employed when desired. The number used depends upon the width of the web. Suitable transverse positioners for the tucking belts may be employed where necessary or convenient.

The drying rollers (25 and 26) are conventional and of the type disclosed in U. S. A. Patent No. 1,606,824 (Brandenberger). The heat supplied thereto warms the web, driving off the moisture contained therein. If desired a heating and drying atmosphere may be circulated about the web during its passage over the rollers as an aid in carrying off the moisture. A housing over the drier section facilitates control of circulation in such a case. The drying of the web is therefore conventional except for the edge of the web being wrapped around the tenter belt in such a manner that the web is always gripped between the belt and the drier roll over which it is passing. In order to take the load off the tenter belt it may sometimes be desirable to employ an auxiliary belt on the ends of the drier rollers to support them. Various forms of such belts may be used, for example, a wide belt may be threaded through the drier rollers at their edges in the same manner as the tenter belt, or a belt may be threaded horizontally from the wind-up toward the adit end of the drier, passing through the nips of the rollers only, and not around the rollers.

The tenter belts restrict the transverse (lateral) shrinkage to a minimum during drying, and it is therefore desirable for certain purposes to permit a controlled amount of longitudinal (machine direction) shrinkage in order that the transverse and longitudinal shrinkage may be accurately correlated to give a product of predetermined properties. As previously indicated, this is accomplished by shirring the gel web and gripping it with the tenter belt simultaneously. By this practice, longitudinal shrinkages as high as 13% (based on the dimensions of the gel web) have been obtained. Such a ratio of longitudinal shrinkage to transverse shrinkage has been heretofore unobtainable.

In Figure 10 the shirring is obtained by a series of interlocking belts. The web leaving the rollers 23 and 24 is laid on a series of belts spaced sufficiently to accommodate another series of belts in alternating relation. These belts 51 approach the interlocking belts 54 angularly. The second series of belts pass around the upper drying roller and support the span of the web while it is being tucked around the gripping belt. The first set of belts travel at a speed equivalent to the peripheral speed of the wet end of the casting machine, and this is somewhat faster than the second set of belts, which travel at the peripheral speed of the first drier roller. The web is therefore fed on to the second set of rollers faster than they can carry it away, and as a result of this tiny ripples or shirrs are formed. The tucking process remains unchanged during the shirring which results from the differential of speed. This is only one of several available schemes to include machine directional shrinkage while utilizing the edge grip drying procedure.

A simplified shirring procedure is illustrated in Figure 12. This modification depends upon the action of belts operating around a small diameter support. The gel web is laid on the series of belts while they are still bent around a curve of small diameter (radius). When the belts leave the curvature and enter a substantially straight span, the outer surfaces of the belts contract and the gel web in contact therewith shirrs as a consequence. The amount of shirring obtained by this method is not so great as that first described, but it is simpler.

In the preferred procedure, the half-twist tenter belt, that is, a tenter belt following exactly the gyrations of the tucking belt, is employed. In this case the edge bead of the web is aligned with the center and on top of the tenter belt. As the tenter belt progresses, the tucking belt contacts (on top and in alignment) the web, and as the associated portions progress further, both the tucking and tenter belt rotate through 180°. As a result, when the first drying roller is contacted the tucking belt is directly beneath the tenter belt.

This procedure causes lateral stretch in the gel web amounting to twice the width of the tenter belt. In some cases it may be desirable to follow this same general scheme, but to put a complete twist in the tenter belt and match it with a complete twist in the tucking belt. Multiple turns about the tenter belts give even more transverse stretch. Such an overlapping arrangement may not only prevent shrinkage, but actually widen the web.

If for any reason it is desired to vary the degree of transverse shrinkage, the course of the tenter belts may be altered, that is to say, these belts need not necessarily be maintained parallel (the same distance apart) throughout the drier. The transverse shrinkage will be proportional to the variation in distance between the belts.

Another modification in the drying pattern may be brought about by using webs or belts around the ends of the drier rollers and maintaining them sufficiently moist to serve as a cooling medium for the roll. Cooling the ends of the rolls somewhat controls the drying pattern to a certain extent.

In operating with the apparatus shown in Figure 11, the regenerated cellulose web is fed on to the tenter belts so that the bead (thickened edge) overhangs each tenter belt by about one-half inch. As the belts with the web lying on the top thereof under relaxed tension, progress, they contact the tucking belt on top of the sheet in a horizontal plane. Within a travel of about 18 inches, the tucking belt changes its plane through 180° (finishing horizontally in contact with the drier roll). The overhanging portion of the web during this time has been tucked, or folded, under the tenter belt, and is then pinched between the tucking belt and tenter belt. After traveling about 120° around the drier roll, the tucking belt separates and returns to the other band of the criss-cross. The tenter belts continue through the drier with the edges of the continuous web tucked thereabout. In this modification (in which the tenter belt is not twisted while in contact with the web) there is no lateral stretch of the gel web before the drying operation begins.

Methods of slitting off the undesirable edges of the dried web other than that described above may be employed, for example, the slitting device may be within the span leaving the drying roller section, following the removal of the web from the tenter belts.

Removing the moisture during drying causes the web to shrink greatly, and also to increase in strength to a marked degree. In normal drying the increase in strength of the web is sufficient to take care of the increased strain due to the shrinkage of the web, provided the drying of the web takes place uniformly. The restriction of transverse shrinkage in the drying operation causes an ever increasing transverse strain in the web, which is sufficient to rupture it in any portion which is not dried to the same extent as that portion which exerts the strain due to shrinkage. For this reason a drying procedure, in which the marginal portion of the web is not permitted to dry at the same rate as the central portion, cannot be operated successfully. It will be seen that the apparatus above described is admirably suited for practical operation, because the marginal portions of the web are held in contact with the heated drying roller by the tenter belt. Not only is the moisture driven from the marginal portion of the web by contact with the drying roller, but in addition, the marginal portion is exposed to the atmosphere in the same manner as the central portion of the web. It follows that drying of the marginal portion proceeds at the same rate as the drying of the central portion, and that the margins gripped by the tenter belt have the necessary strength to hold the web distended without danger of rupture throughout the drying operation. If the gripped marginal portion were maintained enclosed, as for example, by being held between two belts (or a belt grooved to receive a matching cord) while passing through the drying section, the enclosed portions would not dry at the same rate as the central portions of the web, and the drier portions would cause the marginal portions to tear.

A very important feature of the present device is, therefore, that it permits the web to be folded about the tenter belt in such a manner that it contacts both sides of the tenter belt (and the drier roller) in a single layer. Because of the sinuous path followed by the web and the tenter belts as they pass down the drier, the two sides of the belt alternately contact (or are adjacent to) the rollers of the drier.

The drying process described above is applicable to any smooth, non-fibrous web (film, foil, pellicle, ribbon, sheet, skin, tissue) which is subjected to shrinkage upon drying. It is especially useful in the processing of non-porous, cellulosic film of the type precipitated from aqueous cellulosic or aqueous alkaline cellulosic dispersions or solutions. This includes webs of regenerated cellulose, whether precipitated from viscose (solutions of cellulose xanthate), cuprammonium, or any other aqueous solutions or dispersions of cellulose. It also includes webs of cellulose ethers which are precipitated from aqueous solutions or dispersions (usually referred to as low or lowly substituted cellulose ethers because the degree of substitution does not exceed one mol per glucose unit), for example, cellulose glycolic acid, glycol cellulose and alkyl celluloses such as methyl cellulose and ethyl cellulose (U. S. A. Patent No. 2,123,883 to Ellsworth). Work so far completed indicates that it is also applicable to organic solvent soluble cellulose esters and cellulose ethers.

The tenter belt and the tucking belt may be made of various materials, for example, woven or other fabrics such as cotton, linen, silk, nylon, canvas, thin metal (steel tapes, stainless steel ribbon), etc., impregnated fabrics such as rubber impregnated cotton textile, neoprene impregnated cotton textile, etc.

The tenter belts and tucking belts may be of any width, depending upon the results desired. Belt widths of 0.5 of an inch to 3.0 inches have been found satisfactory for continuous webs of regenerated cellulose of conventional width (about 5 feet) and thickness (about 0.001 of an inch). The efficiency of production is lowered in proportion to the increase in belt width (because the marginal portions in contact with the belts, being somewhat marred thereby, are trimmed off as waste before the web is wound upon the mill roll). Otherwise there is no objection to using belts wider than is necessary to furnish sufficient strength to hold the web material and provide sufficient friction with the drying roll. In some situations it may even be desirable to use belts narrower than the aforementioned preferred width range. These belts may have any thickness which will provide suitable flexibility and strength. The thinner belts are preferred. Belt thicknesses of 0.040 of an inch to 0.080 of an inch seem most desirable for web material whose thickness is in the neighborhood of 0.001 of an inch. It has been found that the tenter belts track down the whole length of the drying apparatus without being pulled inward toward the center of the drying web any measurable amount. This is surprising in view of the large force exerted thereupon because of the shrinkage of the film and the lack of frictional resistance due to the smoothness of the surface of the drier rolls. Shallow grooves may be provided in the surface of the rolls to insure this tracking, if desired.

The same is true of the guide pulleys (33, 34, 35, 36, etc.) over which the continuous belts pass on their return to the relatively free space containing the folding (tucking) device.

The present tentering device has the outstanding advantage that it holds the gel, water-sensitive web without tearing during drying, and that it permits the portions of such webs in contact with the tentering device to dry at the point of anchorage at approximately the same rate as the remainder of the web. The sheet material so produced is superior to that produced upon standard and heretofore known forms of apparatus, in that it is more transparent, freer from surface blemishes, and of more uniform physical characteristics (particularly shrinkage and deformation). Furthermore, the sheet material is wider and of increased area, so that the output per casting machine is increased. The fact that satisfactory tentering can be accomplished without fracture of the web because of strains developed during drying, also increases the output per machine because stoppage to remove torn material is obviated.

As many apparently widely different embodiments of this invention may be made without departing from the spirit and scope thereof, it is to be understood that this invention is not limited to the specific embodiments thereof except as defined in the appended claims.

We claim:

1. In the drying of gel water-sensitive web, the steps of wrapping the oppositely disposed marginal portions of the gel web about spaced tenter belts, and thereafter passing the tenter belts and web through a drier comprising a series of heated rollers, the opposite sides of the web being adjacent adjoining rollers and both sides of the web folded about the tenter belt being free to contact the drying rollers.

2. The process of drying continuous cellulosic web which comprises shirring the web lengthwise, wrapping the oppositely disposed marginal portions of the shirred gel web about spaced tenter belts, and thereafter drying the web uniformly across its width while held against transverse shrinkage by said tenter belts.

3. In the drying of continuous regenerated cellulose web, the steps of folding the oppositely disposed marginal portions of the regenerated cellulose web about spaced tenter belts and passing the resulting assembly in a serpentine, sinuous or undulating path about heated drying rollers, while maintaining the tenter belts under tension sufficient to hold the edges of the web against the rollers, whereby the crosswise slippage is restrained so that transverse shrinkage of the web is restricted as moisture is removed therefrom.

4. The process of drying continuous non-fibrous cellulosic web which comprises shirring the web lengthwise, wrapping the oppositely disposed marginal portions of the shirred web about spaced tenter belts, and thereafter drying the web uniformly across its width while held against transverse shrinkage by said tenter belts.

5. The process of drying continuous regenerated cellulosic web which comprises shirring the web lengthwise, wrapping the oppositely disposed marginal portions of the shirred web about spaced tenter belts, and thereafter drying the web uniformly across its width while held against transverse shrinkage by said tenter belts.

6. The process of drying continuous non-fibrous cellulosic web, which comprises shirring the web lengthwise, wrapping the oppositely disposed marginal portions of the shirred web about spaced tenter belts and thereafter drying the web uniformly across its width by passing it about a plurality of heated rollers in a sinuous path so that opposite sides of the web contact adjoining rollers, said tenter belts preventing transverse shrinkage of the web by maintaining its edges a predetermined distance apart.

7. In the drying of gel regenerated cellulose web, the steps of wrapping the oppositely disposed marginal portions of the regenerated cellulose web about spaced tenter belts, and thereafter passing the tenter belts and web through a drier comprising a series of heated rollers, the opposite sides of the web being adjacent adjoining rollers and both sides of the web folded about the tenter belt being free to contact the drying rollers.

8. In the drying of gel regenerated cellulose web, the steps of wrapping the oppositely disposed marginal portions of the regenerated cellulose web about spaced tenter belts, and thereafter passing the tenter belts and web through a drier comprising a series of heated rollers, the opposite sides of the web being adjacent adjoining rollers and both sides of the web folded about the tenter belt being free to contact the drying rollers.

9. In the drying of continuous non-fibrous cellulosic web, the steps of folding the oppositely disposed marginal portions of the web about spaced tenter belts, and passing the resulting assembly in a serpentine, sinuous path about heated drying rollers, while maintaining the tenter belts under tension sufficient to hold the edges of the web against the rollers, whereby the crosswise slippage is restrained so that transverse shrinkage of the web is restricted as moisture is removed therefrom.

10. In the drying of continuous non-fibrous cellulosic web, the steps of shirring the web lengthwise, folding the oppositely disposed marginal portions of the shirred web about spaced tenter belts and passing the resulting assembly in a serpentine path about heated drying rollers, while maintaining the tenter belts under tension sufficient to hold the edges of the web against the rollers, whereby the crosswise slippage is restrained so that transverse shrinkage of the web is restricted as moisture is removed therefrom.

11. In the drying of gel water-sensitive web, the steps of shirring the web lengthwise, wrapping the oppositely disposed marginal portions of the shirred gel web about spaced tenter belts, and thereafter passing the tenter belts and web through a drier comprising a series of heated rollers, the opposite sides of the web being adjacent adjoining rollers and both sides of the web folded about the tenter belt being free to contact the drying rollers.

12. In the drying of continuous non-fibrous water-sensitive cellulosic web, the steps of wrapping the oppositely disposed marginal portions of the web about spaced tenter belts, and thereafter passing the tenter belts and web in assembled relation in a serpentine path over a series of heated rollers to remove the moisture from the web, the opposite sides of the web during moisture removal being adjacent adjoining rollers, both sides of the web wrapped about the tenter belts being free to contact the rollers, and transverse shrinkage of the web being avoided by maintaining the tenter belts under tension sufficient to hold the edges of the web against crosswise slippage.

GEORGE R. ECKSTEIN.
OSCAR W. DIVERALL.